United States Patent
Kim et al.

(10) Patent No.: US 11,244,424 B2
(45) Date of Patent: Feb. 8, 2022

(54) APPARATUS AND METHOD FOR CREATING AND PROVIDING MOSAIC IMAGE BASED ON IMAGE TAG-WORD

(71) Applicant: NHN Corporation, Gyeonggi-do (KR)

(72) Inventors: Hyeon-gi Kim, Gyeonggi-do (KR); Rok-kyu Lee, Gyeonggi-do (KR); Gi-Hyeok Pak, Gyeonggi-do (KR); Chi-Young Song, Gyeonggi-do (KR)

(73) Assignee: NHN CORPORATION, Gyeonggi-do (KR)

( * ) Notice: Subject to any disclaimer, the term of this patent is extended or adjusted under 35 U.S.C. 154(b) by 27 days.

(21) Appl. No.: 16/792,117

(22) Filed: Feb. 14, 2020

(65) Prior Publication Data
US 2020/0265553 A1 Aug. 20, 2020

(30) Foreign Application Priority Data
Feb. 14, 2019 (KR) .................. 10-2019-0017006

(51) Int. Cl.
G06T 11/60 (2006.01)
G06T 3/40 (2006.01)
G06K 9/62 (2006.01)

(52) U.S. Cl.
CPC .......... *G06T 3/4038* (2013.01); *G06K 9/6201* (2013.01); *G06K 9/628* (2013.01); *G06T 11/60* (2013.01); *G06T 2200/24* (2013.01)

(58) Field of Classification Search
CPC ... G06T 3/4038; G06T 2200/32; G06T 11/60; H04N 1/00196
See application file for complete search history.

(56) References Cited

U.S. PATENT DOCUMENTS

2016/0321783 A1* 11/2016 Citrin ................ H04N 1/32106
2020/0089936 A1* 3/2020 Noda ................ G06K 9/00261

* cited by examiner

*Primary Examiner* — Ryan McCulley
(74) *Attorney, Agent, or Firm* — Ladas & Parry, LLP

(57) ABSTRACT

Provided is a system and method for creating and providing a mosaic image based on an image tag-word by a mosaic service providing server, which includes: determining each tag-word for each image and classifying a plurality of images according to the determined tag-word; determining a target image among the plurality of images; providing a pixel image selection interface for selecting a pixel image for mosaicizing the determined target image based on the tag-words of the plurality of images; and creating a mosaic image for the target image based on the pixel image selected through the pixel image selection interface.

15 Claims, 5 Drawing Sheets

[FIG. 1]
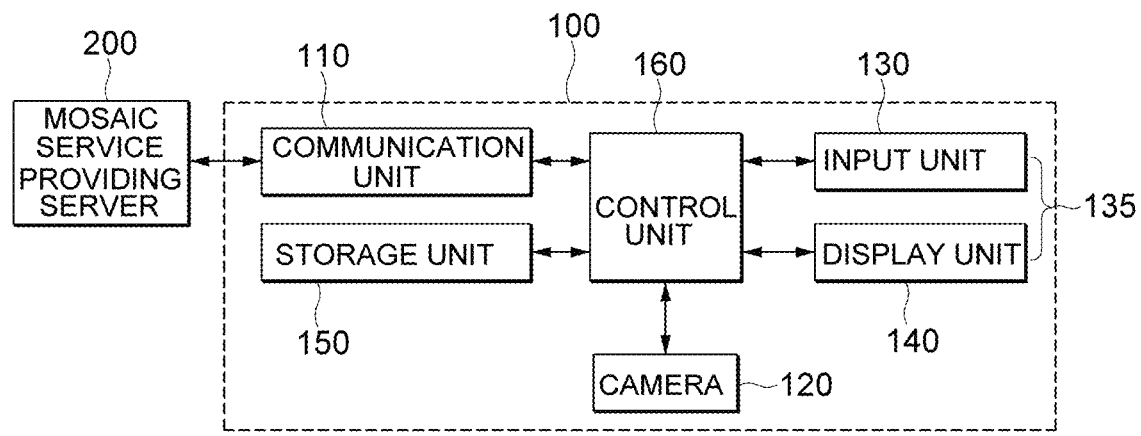
[FIG. 2]
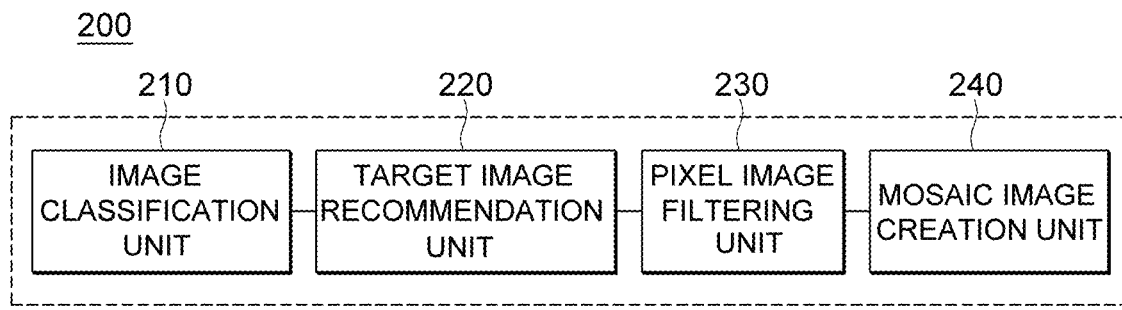

[FIG. 3]
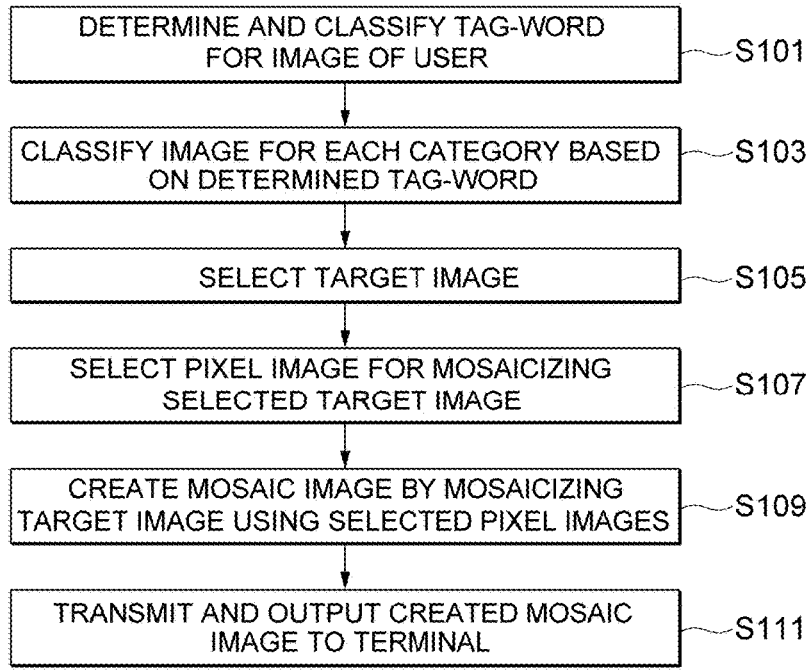
[FIG. 4]
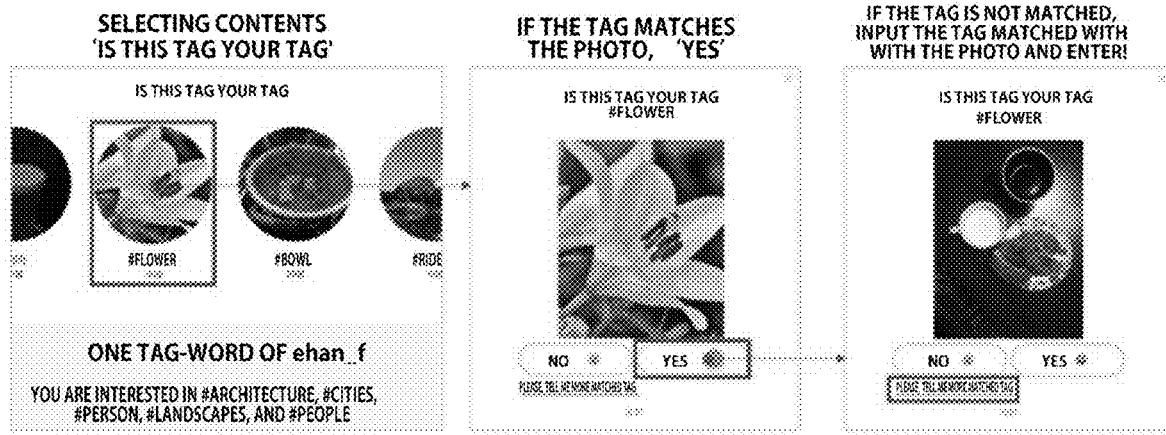

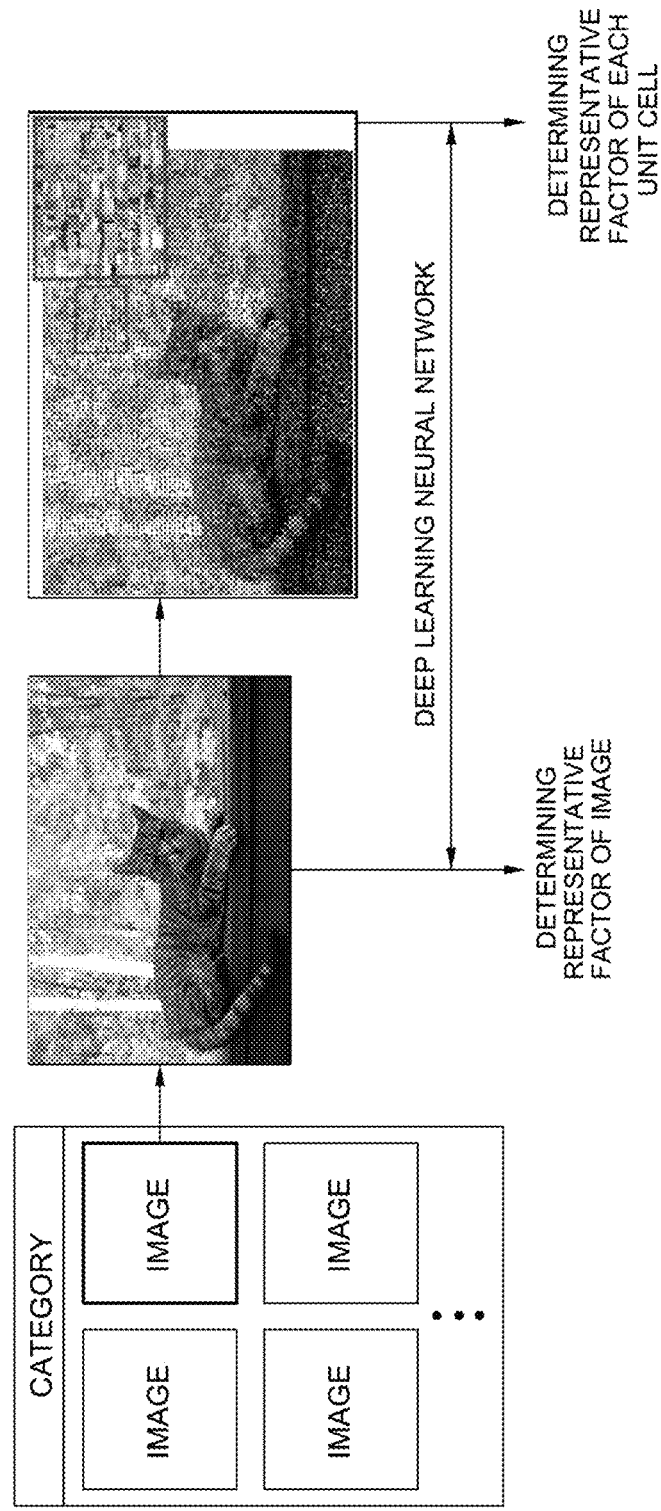

[FIG. 6]
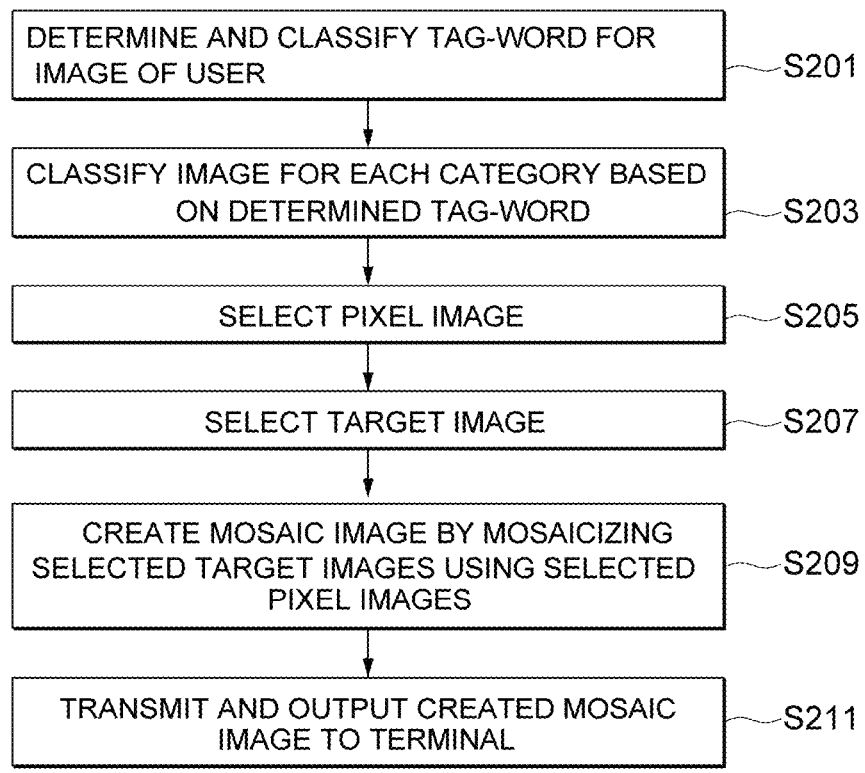

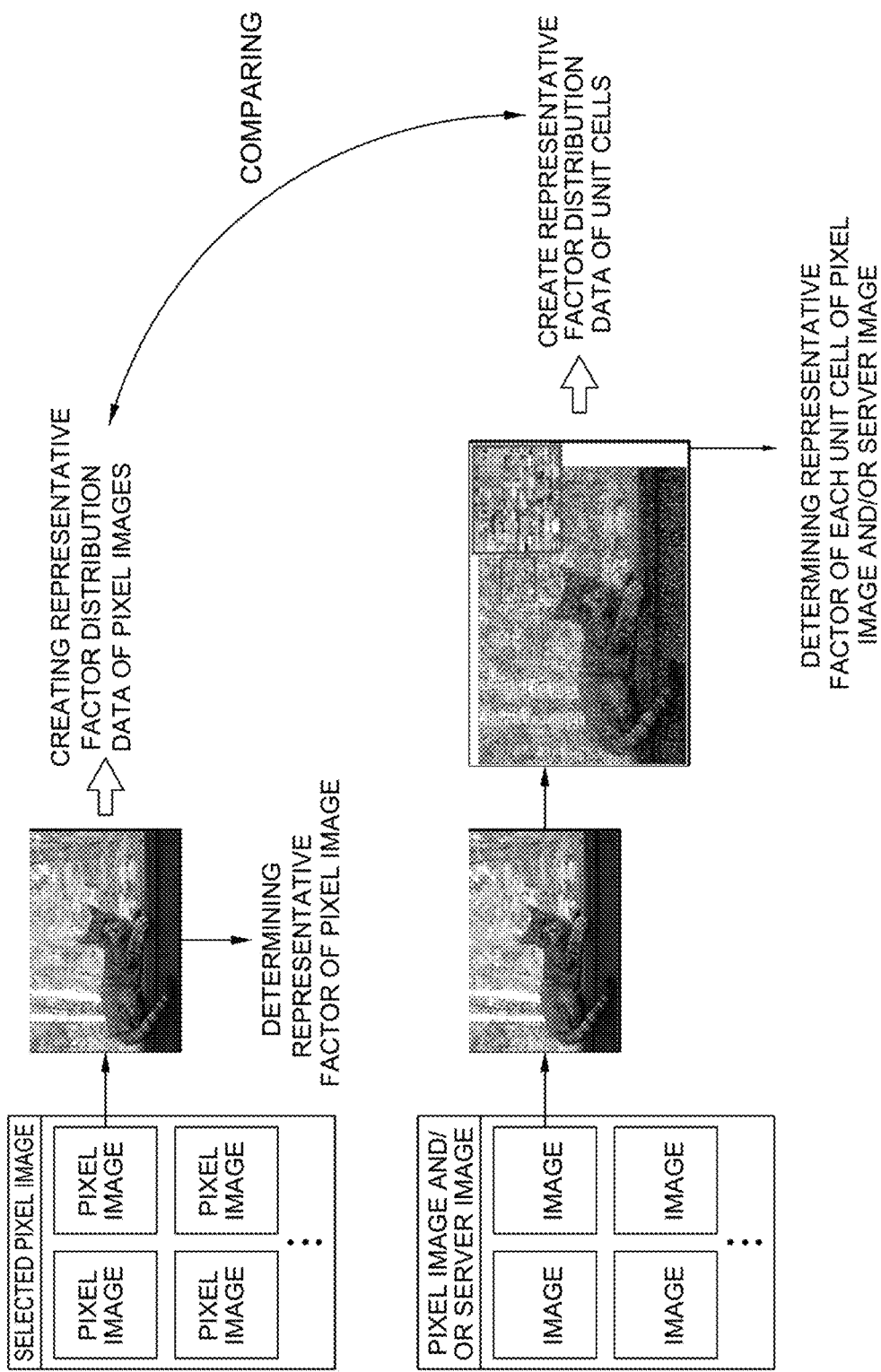

APPARATUS AND METHOD FOR CREATING AND PROVIDING MOSAIC IMAGE BASED ON IMAGE TAG-WORD

CROSS REFERENCE TO RELATED APPLICATION(S)

This application claims the priority to Korean Patent Application No. 10-2019-0017006, filed on Feb. 14, 2019, which is all hereby incorporated by reference in its entirety.

BACKGROUND

Technical Field

The present disclosure may generally relate to an apparatus and method that create and provide a mosaic image based on an image tag-word. More particularly, some embodiments of the present disclosure relate to an apparatus and method that create and provide a mosaic image based on an image tag-word using a deep-learning neural network.

Related Art

Photo mosaic is a technology that creates a single mosaic-type image by collecting a number of different photos or pictures.

A representative algorithm of a photo mosaic creation algorithm is Robert Silver's Algorithm and is configured by a method that divides a target image to be mosaicized into a predetermined number of blocks (unit cells) and also divides a block of a source image (pixel image) into a predetermined number of blocks, divides a grid of the target image and the grid of the source image into the same subdivisions (3×3), respectively, and select a tile in which the sum of Red Green Blue (RGB) color distances among the respective subdivisions becomes minimum.

In other words, when the photo mosaic technology is applied to the target image, a photo mosaic-type image constituted by photo mosaic blocks is created.

Here, the photo mosaic-type image is created to be similar to the target image and each photo mosaic block is constituted by separate source images.

However, in using the photo mosaic technology, it is difficult for a user to arbitrarily select source images in which the photo mosaic-type image may be implemented most similar to the target image among numerous images.

Further, the user needs to select numerous source images of a predetermined number in order to create the photo mosaic-type image and there is a case where only images classified into a specific category should be selected according to a situation, but there is a lock of a technology that can effectively select the source image by conveniently classifying, extracting, and combining numerous images according to a demand of the user.

It is with respect to these and other general considerations that the following embodiments have been described. Also, although relatively specific problems have been discussed, it should be understood that the embodiments should not be limited to solving the specific problems identified in the background.

SUMMARY

Various exemplary embodiments of the present disclosure have been made in an effort to provide an apparatus and method for creating and providing a mosaic image based on an image tag-word, in which a user can configure a mosaic image by conveniently classifying, extracting, and combining an image by matching a tag-word and/or a category with the image so as for the user to effectively select images to be used as a component of the mosaic image.

Further, some exemplary embodiments of the present disclosure have been made in an effort to provide an apparatus and method for creating and providing a mosaic image based on an image tag-word, which can automatically select and provide an image suitable for configuring a mosaic image to create the mosaic image efficiently and rapidly.

However, a technical object to be achieved by the present disclosure and an exemplary embodiment of the present disclosure is not limited to the technical objects and there may be other technical objects.

In an aspect, provided is a method for creating and providing a mosaic image based on an image tag-word by a mosaic service providing server, which includes: determining a tag-word for each image and classifying a plurality of images according to the tag-word; determining a target image among the plurality of images; providing a pixel image selection interface of selecting a pixel image for mosaicizing the determined target image based on the tag-word; and creating a mosaic image for the target image based on the pixel image selected through the pixel image selection interface.

In this case, the determining of the tag-word for each image and classifying of the plurality of images according to the tag-word may include determining a tag-word automatically determined by inputting the image into a deep learning neural network as the tag-word of the image.

Further, the method may further include creating a category including at least one determined tag-word and classifying the plurality of images having the tag-word into the category.

Further, the determining of the target image among the plurality of images may include providing a recommended target image for each category using the deep learning neural network, and acquiring an input of a user of selecting the target image from the recommended target image.

Further, the providing of the recommended target image for each category using the deep learning neural network may include comparing representative factor distribution data of the images in each category and representative factor distribution data of unit cells of each image in each category and detecting an image in each category, in which a matching rate of the representative factor distribution data of the images in each category and the representative factor distribution data of the unit cells of each image in each category satisfies a predetermined criterion or higher and providing the detected image as the recommended target image.

Further, the providing of the pixel image selection interface may include selecting the tag-word or category and selecting images which belong to the tag-word or the category as the pixel image.

Further, the providing of the pixel image selection interface may further include providing a recommended tag-word using the deep learning neural network.

Further, the creating of the mosaic image may include classifying the target image into a plurality of unit cells, matching the pixel image for each unit cell, and inserting the pixel image matched with the unit cell.

In another aspect, provided is a method for creating and providing a mosaic image based on an image tag-word by a mosaic service providing server, which includes: determining a tag-word for each image and classifying a plurality of images according to the tag-word; determining a pixel image among the plurality of images; providing a target image selection interface of selecting a target image for mosaicizing the determined pixel image based on the tag-word; and creating a mosaic image based on the selected pixel image and the target image selected through the target image selection interface.

In this case, the providing of the target image selection interface of selecting the target image for mosaicizing the determined pixel image based on the tag-word may include detecting and providing a recommended target image among the selected pixel image or the plurality of images using a deep learning neural network, and acquiring an input of a user of selecting the target image based on the recommended target image or the plurality of images.

Further, the detecting and providing of the recommended target image may include comparing representative factor distribution data of the selected pixel images and representative factor distribution data of unit cells of the respective selected pixel images and detecting the pixel image, in which a matching rate of the representative factor distribution data of the selected pixel images and the representative factor distribution data of the unit cells of each selected pixel image satisfies a predetermined criterion or higher and providing the detected pixel image as the recommended pixel image.

In yet another aspect, provided is an apparatus for creating and providing a mosaic image based on an image tag-word, which includes: a storage storing a plurality of images and a program for creating a mosaic image based on the plurality of images; a display unit outputting the created mosaic image; and a control unit reading the program of the storage unit and creating the mosaic image, in which the control unit determines a tag-word for each image and classifies the plurality of images according to the tag-word, determines a target image among the plurality of images, provides a pixel image selection interface of selecting a pixel image for mosaicizing the determined target image based on the tag-word, creates a mosaic image for the target image based on the pixel image selected through the pixel image selection interface, and controls the display unit to output the created mosaic image.

In this case, the control unit may create a category including at least one determined tag-word and classify the plurality of images having the tag-word into the category.

Further, the control unit controls to provide a recommended target image for each category using a deep learning neural network, and acquire an input of a user of selecting the target image from the recommended target image and determine the target image among the plurality of images.

Further, the control unit may compare representative factor distribution data of the images in each category and representative factor distribution data of unit cells of each image in each category and detect an image in each category, in which a matching rate of the representative factor distribution data of the images in each category and the representative factor distribution data of the unit cells of each image in each category satisfies a predetermined criterion or higher and provide the detected image as the recommended target image.

Further, the control unit may select the tag-word or category and select images which belong to the tag-word or the category as the pixel image, and provide a recommended tag-word using the deep learning neural network.

Further, the control unit may classify the target image into a plurality of unit cells, match the pixel image for each unit cell, and insert the pixel image matched with the unit cell to create the mosaic image.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 1 is a block diagram of a terminal according to an exemplary embodiment of the present disclosure.

FIG. 2 is a block diagram of a mosaic service providing server according to an exemplary embodiment of the present disclosure.

FIG. 3 is a flowchart for describing a method for creating and providing a mosaic image based on an image tag-word according to an exemplary embodiment of the present disclosure.

FIG. 4 illustrates an example of an interface for receiving a feedback from a user during a process of determining an image tag-word according to an exemplary embodiment of the present disclosure.

FIG. 5 is a diagram for describing a method for recommending a target image according to an exemplary embodiment of the present disclosure.

FIG. 6 is a flowchart for describing a method for creating and providing a mosaic image based on an image tag-word according to another exemplary embodiment of the present disclosure.

FIG. 7 is a diagram for describing a method for recommending a target image according to another exemplary embodiment of the present disclosure.

DESCRIPTION OF EXEMPLARY EMBODIMENTS

The present invention may have various modifications and various embodiments and specific embodiments will be illustrated in the drawings and described in detail in the detailed description. Effects and features of the present disclosure, and methods for accomplishing the same will be more clearly understood from exemplary embodiments described in detail below with reference to the accompanying drawings. However, the present disclosure is not limited to embodiments disclosed below but may be implemented in various forms. In the following exemplary embodiment, the terms such as first, second, etc., are not restrictive meanings but are used for distinguishing one component from other components. Further, a singular form may include a plural form if there is no clearly opposite meaning in the context. Further, the terms such as "include" or "have" mean that there is a feature or a component disclosed in the specification and a possibility that one or more other features or components will be added is not pre-excluded. In addition, in the drawing, for convenience of description, sizes of the components may be exaggerated or reduced. For example, each configuration illustrated in the drawings is arbitrarily shown for understanding and ease of description, but the present invention is not limited thereto.

In the present disclosure, a "unit" may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The "unit" (whether hardware, software, or a combination thereof) may be designed to implement or execute one or more particular functions or routines.

Hereinafter, the exemplary embodiments of the present disclosure will be described in detail with reference to the accompanying drawings, in which like reference numerals refer to like or corresponding elements and a duplicated description thereof will be omitted when the exemplary embodiments are described with reference to the drawings.
Terminal First, in an exemplary embodiment of the present disclosure, a terminal 100 may be configured to receive or acquire and store an image which becomes a basis for creating a mosaic image and may transmit the acquired image to an external server (e.g., a server for providing a mosaic service and/or a social network service (SNS) server).

Further, the terminal 100 may receive and output the mosaic image created based on the image from the mosaic service providing server 200. Alternatively, the terminal 100 may create the mosaic image based on the image through direct data processing and then output the created mosaic image.

Furthermore, the terminal 100 may provide an interface which allows a user to select a target image to be used for creating a mosaic image.

Specifically, the terminal 100 may acquire a user input of selecting at least one of a target image and a pixel image for creating the mosaic image.

Here, the mosaic image may mean an image created by combining a plurality of pixel images in a mosaic scheme based on the target image.

Further, the target image may mean an image to be expressed as the mosaic image by combining a plurality of images, i.e., the target images.

Further, the pixel image may mean an image to be inserted into each unit cell of the mosaic image, i.e., a source image.

In this case, the unit cell may mean a cell created by dividing the image into predetermined units (e.g., 100×100 blocks).

Meanwhile, in an exemplary embodiment of the present disclosure, the terminal 100 may include, for example, but not limited to, a smart phone, a digital broadcasting terminal, a cellular phone, a personal digital assistants (PDA), a portable multimedia player (PMP), a navigation, a tablet, a portable personal computer (PC), a wearable device, a smart glass, and any portable device in which a program for performing a service for creating a mosaic image based on an image tag-word is installed.

Additionally, the terminal 100 may include devices in which a program for providing a service for creating a mosaic image based on a image tag-word is installed based on wired/wireless communication, such as personal computers including a desktop PC which is a fixed terminal, a laptop computer, and an ultrabook.

For convenience of description, some embodiments of the present disclosure described as follows use the terminal 100 as a portable terminal, but it should be appreciated that the embodiments of the present disclosure should not be limited to such. One having ordinary skill in the art would understand that the following embodiments of the present disclosure can use other examples of the terminal 10 listed above.

FIG. 1 is a block diagram of a terminal 100 according to an exemplary embodiment of the present disclosure.

Referring to FIG. 1, the terminal 100 may include a communication unit 110, a camera or image capturing device 120, an input unit 130, a display or output unit 140, a storage unit or memory 150, and a control unit or controller or processor 160. Alternatively, the input unit 130 and the output unit 140 can be implemented as a single device, such as a touch screen 135.

First, the communication unit 110 may be configured to transmit and receive various data and/or information for providing a service for creating a mosaic image based on an image tag-word.

In an exemplary embodiment, the communication unit 110 may transmit and receive data associated with the service in order to provide the service for creating the mosaic image based on the image tag-word through communication with the terminal 100 and/or the mosaic service providing server 200 of other users.

Further, the communication unit 110 may also transmit an image to a printer to print the transmitted image as an offline output.

Further, the communication unit 110 may transmit and receive radio signals to and from at least one of a base station, another terminal, and a server over wireless or wire communication, for example, but not limited to, a mobile communication network constructed according to technical standards or communication methods of mobile communication (e.g., Global System for Mobile communication (GSM), Code Division Multi Access (CDMA), High Speed Downlink Packet Access (HSDPA), High Speed Uplink Packet Access (HSUPA), Long Term Evolution (LTE), Long Term Evolution-Advanced (LTE-A), etc.).

Next, the camera 120 may capture or acquire an image by photographing in response to an input of the user, and the terminal 100 may output the acquired image through the display unit 140 and record the image in the storage unit 150.

Further, the camera 120 may be disposed on a front side or/and a rear side of the terminal 100 and may be configured to photograph a disposed direction side to acquire the image. Alternatively, and the camera 120 may be disposed outside the terminal 100 to photograph for a medical treatment process at an external viewpoint.

In the exemplary embodiment that the camera 120 is disposed outside the terminal 100, the camera 120 may transmit the photographed image to the terminal 100 such as the control unit 160 through the communication unit 110.

In addition, the camera 120 may include an image sensor and an image processing module.

For example, the camera 120 may process a still image (i.e., image) and/or a moving picture obtained by the image sensor (e.g., Complementary Metal-Oxide-Semiconductor (CMOS) or Charge-Coupled Device CCD).

Further, the camera 120 may extract required information by processing the still image or the moving picture acquired through the image sensor using the image processing module and transfer the extracted information to the control unit 160. Alternatively, the image processing module can be included in the control unit 160.

Next, the input unit 130 may receive or sense an input of the user associated with a service for creating a mosaic image based on an image tag-word.

For example, the input unit 130 may receive sense an input of the user through an interface that the user can select a target image, and/or an input of the user through an interface that the user can select a pixel image.

Next, the display unit 140 may output various information associated with the service for creating the mosaic image based on the image tag-word by a graphic image.

The display unit 140 may include, for example, but not limited to, at least one of a liquid crystal display (LCD), a thin film transistor-liquid crystal display (TFT LCD), an organic light-emitting diode (OLED), a flexible display, a 3D display, and an electronic ink (e-ink) display.

Alternatively, the input unit 120 and the display unit 130 may be implemented as a single device such as the touch screen 135.

Next, the storage unit 150 may store at least any one of various application programs, data, and commands of providing the service for creating the mosaic image based on the image tag-word according to an exemplary embodiment of the present disclosure.

The storage unit 150 may be various storage devices including, for example, but not limited to, a ROM, a RAM, an EPROM, a flash drive, a hard drive, etc., a web storage, or any device that can perform a storage function.

Last, the control unit 160 may control an overall operation of each component of the terminal 100 in order to provide the service for creating the mosaic image based on the image tag-word.

The control unit 160 may be implemented as a processor using, for example, but not limited to, at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

However, the components illustrated in FIG. 1 are examples only, and the terminal 100 described in the present disclosure may thus have components more or less than components listed above.

Mosaic Service Providing Server

Meanwhile, in an exemplary embodiment of the present disclosure, a server for providing a mosaic service, or a mosaic service providing server, 200 may receive an image from the terminal 100 and/or the external server (e.g., social network service (SNS) server), and create a mosaic image based on the received image.

Hereinafter, in an exemplary embodiment, it will be described that the mosaic service providing server 200 may create the mosaic image based on the image. However, in some exemplary embodiments, data processing in which the terminal 100 directly creates the mosaic image may be performed.

Specifically, the mosaic service providing server 200 may create the mosaic image by performing deep learning based on the received image.

Further, the mosaic service providing server 200 may transmit the created mosaic image to the terminal 100, and the terminal 100 may output the mosaic image received from the mosaic service providing server 200 to provide the received mosaic image to the user.

FIG. 2 is a block diagram of a mosaic service providing server 200 according to an exemplary embodiment of the present disclosure.

More specifically, referring to FIG. 2, in the exemplary embodiment of the present disclosure, the mosaic service providing server 200 may include an image classification unit 210, a target image recommendation unit 220, a pixel image filtering unit 230, and a mosaic image creation unit 240. The image classification unit 210, the target image recommendation unit 220, the pixel image filtering unit 230, and the mosaic image creation unit 240 may be a hardware based unit, a software based unit or a combination of hardware and software. The hardware based unit may include self-contained components such as a processor, chipsets, specialized circuitry and one or more memory devices, while the software-based unit may be part of a program code or linked to the program code containing specific programed instructions, which may be loaded in memory. For example, the image classification unit 210, the target image recommendation unit 220, the pixel image filtering unit 230, and the mosaic image creation unit 240 may be implemented as one or more processors and/or memory designed to implement or execute one or more particular functions or routines.

First, the image classification unit 210 may be configured to determine a tag-word for the image acquired from the terminal 100 and/or the external server through the deep learning neural network and to classify the image based on the determined tag-word.

Further, the image classification unit 210 may be configured to create a category including a plurality of tag-words and to classify and manage images each having a tag-word into the corresponding category.

Next, the target image recommendation unit 220 may be configured to detect and provide an appropriate target image according to a situation such as predetermined processes.

In an exemplary embodiment, the target image recommendation unit 220 may be configured to detect and provide a recommended target image for each category and to select and provide a target image suitable for the selected pixel image.

Next, the pixel image filtering unit 230 may be configured to filter and provide a pixel image to be used for creating a mosaic image from the image of the user using the tag-word, the category, and/or the deep learning neural network.

In this case, the image of the user as the image acquired by the user input from the terminal 100 and/or the external server may be, for example, at least one of an image in the terminal 100 of the user, an image acquired from a cloud server, and an image acquired from the social network service (SNS) server.

In an exemplary embodiment, the pixel image filtering unit 230 may be configured to filter and provide the image included in the tag-word or the category suitable for mosaicizing the selected target image and to filter and provide the image included in the tag-word and/or the category which the user inputs through an image search interface.

Last, the mosaic image creation unit 240 may create the mosaic image based on the target image and the pixel image.

Meanwhile, the respective constituent units (i.e., the image classification unit 210, the target image recommendation unit 220, the pixel image filtering unit 230, and/or the mosaic image creation unit 240) of the mosaic service providing server 200 may be directly installed in the mosaic service providing server 200 or installed in an external server which is a separate device from the mosaic service providing server 200.

For instance, the image classification unit 210, the target image recommendation unit 220, the pixel image filtering unit 230, and/or the mosaic image creation unit 240 may be included in respective separate servers.

In this case, the respective constituent units of the mosaic service providing server 200 may include a data transmitting/receiving unit, a data processing unit, and a database.

Here, the data transmitting/receiving unit may transmit and receive various data for performing the service for providing the mosaic image based on the image tag-word to and from the terminal 100 and/or the external server through a network.

Further, the data processing unit may perform a series of data processing for providing the service for creating the mosaic service based on the image tag-word.

In this case, in an exemplary embodiment, the data processing unit may perform deep learning based on the image received in link with an image deep learning neural network.

Here, in some exemplary embodiments, the image deep learning neural network may be directly installed in the mosaic service providing server 200 and/or each constituent unit or perform deep learning by receiving the image as a separate device from the mosaic service providing server 200 and/or each constituent unit.

Hereinafter, an exemplary embodiment in which the image deep learning neural network is directly installed in each constituent unit and performs the deep learning will be described, but the present disclosure is not limited thereto.

Specifically, the data processing unit may read a deep learning neural driving program from the database and perform the deep learning according to a deep learning neural network system constructed according to the read driving program. The data processing unit may be implemented using, for example, but not limited to, at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

Meanwhile, the database may store various data associated with the service for creating the mosaic image based on the image tag-word.

As an exemplary embodiment, the database may store the deep learning neural network driving program and may be provided by a request of the data processing unit.

The database may be various storage devices including, for example, but not limited to, a ROM, a RAM, an EPROM, a flash drive, a hard drive, a web storage, or any device that can perform a storage function of the database on the Internet.

Method that Creates Mosaic Image Based on Image Tag-Word

Hereinafter, some exemplary embodiments of a method for creating a mosaic image based on an image tag-word will be described in detail with reference to the accompanying drawings.

FIG. 3 is a flowchart for describing a method for creating and providing a mosaic image based on an image tag-word according to an exemplary embodiment of the present disclosure.

Referring to FIG. 3, the server for providing a mosaic service or the mosaic service providing server 200 (hereinafter, referred to as "mosaic server") according to an exemplary embodiment may create a mosaic image by first selecting a target image and then selecting pixel images to be used for mosaicizing the selected target image in order to create and provide the mosaic image based on an image tag-word.

Specifically, the mosaic server 200 first may determine and classify the tag-word for the image of the user (S101).

Here, the image of the user may be an image acquired by the user input from the terminal 100 and/or an external server. For example, the image of the user may be at least one of an image in the terminal 100 of the user, an image acquired from a cloud server, and an image acquired from the social network service (SNS) server.

Further, in the exemplary embodiment, the tag-word may mean a representative word for classifying an image. For example, an image including a 'mountain' object may be classified into a 'mountain' category and matched with a 'mountain' tag-word.

The tag-word may be used when the user searches the image, and when the user searches the image through the tag-word, a Hashtag function to group and view all images to which the corresponding tag-word is tagged may be provided.

Returning back to detail, the mosaic server 200 may determine a tag-word matched with each image of the user based on the deep learning through the image classification unit 210 and classify the image based on the determined tag-word.

As such, the mosaic server 200 may match the tag-word with the image using the deep learning configured to determine tag-words corresponding to images and to classify the images according to the tag-words without a manual task by the user.

Further, the mosaic server 200 may receive a feedback from the user during the process of determining the tag-word of the image.

For example, referring to FIG. 4, the mosaic server 200 may provide a user interface configured to provide the tag-word of the image, which is determined through the deep learning, to the user together with the corresponding image in link with the terminal 100.

In addition, the mosaic server 200 may acquire whether the tag-word is matched indicating whether the image and the tag-word determined for the corresponding image are correctly matched from a user input through the user interface.

In this case, the mosaic server 200 may finally determine the tag-word determined by the deep learning as the tag-word of the image when the image and the tag-word are matched with each other and reflect the corresponding information to the deep learning neural network and then redetermine the tag-word of the image by reperforming the deep learning.

Further, the mosaic server 200 may receive the tag-word to be matched with the image from the user in link with the terminal 100 and create the received tag-word as an additional tag-word.

As such, the mosaic server 200 may accept the feedback from the user at the time of determining the tag-word of the image to determine the image tag-word by considering cognitive determination in addition to artificial intelligence determination in order to enhance accuracy of classification.

Next, the mosaic server 200 that determines and classifies the image tag-word may classify an image into one of multiple categories based on the tag-word determined at S101 (S103).

For instance, the mosaic server 200 may create a category including a plurality of tag-words through the image classification unit 210, and may classify and manage the images including the tag-word included in the corresponding category into the corresponding category.

Specifically, the image classification unit 210 may set an upper concept including covering a plurality of tag-words having the same or common concept as one category, and classify the tag-words and the images included in that concept or matched with the tag-word into the one category.

For example, the mosaic server 200 may classify images matched with tag-words such as 'river', 'mountain', and/or 'ocean' into a 'landscape' category and/or a 'travel' category. As another example, the mosaic server 200 may classify images matched with tag-words such as 'dog' and/or 'cat' into a 'companion animal' category.

As such, the mosaic server 200 creates a category which may include the plurality of tag-words and classifies images to more systematically and efficiently manage the images and to be used in an image search/selection process.

Next, the mosaic server 200 that classifies the images may determine a target image for each category among a plurality of images classified into multiple categories (S105).

Here, the target image may mean an image to be expressed as a mosaic image by combining a plurality of images, i.e., the target images.

The target image may become the image of the user and become an image (e.g., a noted film image) provided by the mosaic server 200.

For example, the mosaic server 200 may receive the input of the user selecting the target image in link with the terminal 100 in order to select the target image.

The mosaic server 200 may select a target image to be expressed as the mosaic image based on the received input of the user.

Alternatively, the target image recommendation unit 220 of the mosaic server 200 may select or recommend an image suitable to be created as the mosaic image for each category and then determine the recommended image as the target image automatically or according to the selection of the user.

In other words, when the target image recommendation unit 220 intends to create the mosaic image as the images in the category, the target image recommendation unit 220 may select or detect at least one image which is most suitable and may output or recommend the detected image to the user or determine the recommended image as the target image.

For example, referring to FIG. 5, the mosaic server 200 may first determine a representative factor of each image in a first category.

Here, the factor of the image may be a factor representing a color and/or a texture. For example, the factor may be R (red), G (green), and B (blue) values representing the color of the pixel constituting the image.

In addition, the representative factor of the image may include color or/and texture factors represented by an entire image constituted by the pixels. For example, the representative factor may be an average value of the colors or/and textures of the pixels.

The mosaic server 200 may calculate the color and/or texture factor for each image in the first category through the deep learning neural network and determine the representative factor of each image in the first category.

Subsequently, the mosaic server 200 that determines the representative factor of each image in the first category may create representative factor distribution data of the images in the first category.

Here, the representative factor distribution data may mean data representing which distribution representative factors of a plurality of images have.

For example, the representative factor distribution data may be graph data representing a distribution form of a plurality of representative factors in a histogram format.

Thereafter, the mosaic server 200 that creates the representative factor distribution data of the images in the first category may divide each image in the first category into unit cells.

In other words, the mosaic server 200 may divide each image in the first category into predetermined units (e.g., 100×100 blocks) and constitute the divided images as a set of the unit cells.

Then, the mosaic server 200 may determine the representative factor of each unit cell of each image in the first category through the deep learning neural network.

In addition, the mosaic server 200 may create the representative factor distribution data of the unit cells acquired for each image in the first category.

Subsequently, the mosaic server 200 may calculate a matching rate by comparing the created representative factor distribution data of the first category and representative factor distribution data of unit cells of a single image.

In other words, the mosaic server 200 selects one or more images having representative factor distribution data having a high matching rate with the representative factor distribution data of the first category to detect an image in the first category suitable to be created as the images in the first category.

Thereafter, the mosaic server 200 may detect one or more images in the first category, in which the matching rate of the representative factor distribution data of the images in the first category and the representative factor distribution data of the unit cells acquired for each image in the first category is higher than a predetermined criterion (e.g., a predetermined percentage) as a result of the comparison.

In addition, the mosaic server 200 may determine at least one detected image in the first category as a recommended target image of the first category.

Further, the mosaic server 200 may determine the recommended target images for a plurality of categories by the same scheme as the description. In other words, the mosaic server 200 may determine the recommended target image for each category.

The mosaic server 200 that determines the recommended target image for each category may provide the determined recommended target image for each category to the user through the terminal 100.

Further, the mosaic server 200 may provide the recommended target image for each category to the user and then select the target image according to the user's selection of the target image received by an input of the user acquired through the terminal 100.

As such, the mosaic server 200 can automatically select or detect and output or recommend the target image suitable for creating the mosaic image for each category to provide a target image capable of creating a high-fidelity mosaic image based on the images included for each category and guide the user to select the provided target image. Next, the mosaic server 200 that selects the target image may select a pixel image for mosaicizing the determined target image (S107).

Specifically, the mosaic server 200 may first provide to the user a pixel image selection function based on the tag-word and/or category matched with the image through the pixel image filtering unit 230.

In other words, the mosaic server 200 may provide an interface that a user can select the tag-word or/and category and select the images which belong to the corresponding tag-word or/and category as the pixel image. Accordingly, the user may not need to select the pixel image to be used for creating the mosaic image one by one. Further, the user may easily determine pixel images having highly related to the target image through selection of the tag-word or category.

More specifically, the mosaic server 200 may provide to the user a pixel image selection interface capable of searching the pixel image to be used for creating the mosaic image through the tag-word and/or category in link with the terminal 100 and selecting a predetermined number or more of images to be used as the pixel image among the images matched with the tag-word and/or category output through the search.

In addition, the mosaic server 200 may select pixel images for mosaicizing the selected target image based on the user input acquired through the pixel image selection interface.

As such, the mosaic server 200 may match the tag-word and/or category with the image and may allow the user to configure the mosaic image by classifying, extracting, and combining the image based on the tag-word and/or category matched with the image to allow the user to conveniently select the pixel images that are to constitute the mosaic image according to the demand of the user.

Alternatively, the mosaic server 200 may automatically filter and provide the image included in the tag-word and/or category suitable for mosaicizing the selected target image.

Specifically, the mosaic server 200 may extract the pixel images included in the category to which the target image belongs and output or recommend the extracted images to the user through the terminal 100.

Further, the mosaic server 200 may extract the pixel images which belong to a tag-word which is the same as the tag-word of the target image and output or recommend the extracted pixel images to the user through the terminal 100.

In other words, the mosaic server 200 provides one or more images included in the tag-word and/or category of the target image as the recommended pixel image to create the mosaic image with images related to the target image selected by the user.

Furthermore, the mosaic server 200 may acquire representative factor distribution data of target image unit cells and detect category representative factor distribution data and/or tag-word representative factor distribution data having a high matching rate with the acquired representative factor distribution data of the target image unit cells, using deep learning through the pixel image filtering unit 230.

Specifically, the mosaic server 200 may create at least two representative factor distribution data among representative factor distribution data of the target image unit cells, representative factor distribution data for each category, and representative factor distribution data for each tag-word through the deep learning neural network.

In this case, the representative factor distribution data for each category may be acquired by performing the deep learning of determining the representative factor of each category by performing the deep learning based on the plurality of images which belong to each category and synthesizing the determined representative factor for each category.

Further, the representative factor distribution data for each tag-word may be acquired by performing the deep learning of determining the representative factor of each tag-word by performing the deep learning based on the plurality images which belongs to each tag-word and synthesizing the determined representative factor of each tag-word.

In addition, the mosaic server 200 compares the created representative factor distribution data of the target image unit cells with the representative factor distribution data for each category and/or tag-word to acquire category and/or tag-word representative factor distribution data showing a matching rate which is equal to or more than a predetermined criterion (e.g., a predetermined percentage).

Thereafter, the mosaic server 200 may extract the pixel images included in the corresponding category and/or tag-word of the detected category and/or tag-word representative factor distribution data and provide the extracted pixel images to the user through the terminal 100.

As such, the mosaic server 200 may automatically select and provide pixel images suitable for constituting the mosaic image to be created based on the target image to easily and accurately provide pixel images to create the selected target image as the high-fidelity mosaic image.

Next, the mosaic server 200 that selects the target image and the pixel image may create the mosaic image by mosaicizing the selected target image using the selected pixel images (S109).

Specifically, the mosaic image creation unit 240 of the mosaic server 200 may create the mosaic image by replacing the unit cells of the target image with the plurality of pixel images.

For instance, the mosaic server 200 may match a pixel image having a representative factor of a pixel image having a highest matching degree (i.e., matching rate) with the representative factor of each unit cell of the target image with the corresponding unit cell and insert the pixel image. In other words, the matching processing according to the exemplary embodiment of the present disclosure may maximize an overall color and/or texture similarity between each unit cell of the target image and the pixel image.

Further, the mosaic image creation unit 240 may create the mosaic image based on the target image and the plurality of pixel images using an automatic photo mosaic algorithm based on Earth Mover's Distance (EMD).

As such, the mosaic server 200 creates the mosaic image by matching the pixel image suitable for each unit cell of the target image using the deep learning neural network and/or Earth Mover's Distance (EMD). Accordingly, the exemplary embodiment may create a high-quality mosaic image expressing the target image with a high similarity using the pixel images.

Next, the mosaic server 200 that creates the mosaic image may transmit the created mosaic image to the terminal 100 and the terminal 100 may output the transmitted mosaic image (S111).

Specifically, the mosaic server 200 may transmit the created mosaic image to the terminal 100 and the terminal 100 that receives the mosaic image from the mosaic server 200 may output the received mosaic image as the graphic image through the display unit and provide the output mosaic image to the user. In another exemplary embodiment, the control unit 160 of the terminal 100 may create the mosaic image by performing at least a part of data processing performed by the mosaic server 200. Specifically, the control unit 160 of the terminal 100 may (1) determine and classify the tag-word for the images of the user stored in the storage unit 150, (2) classify the image for each category based on the determined tag-word, (3) determine the target image, (4) select the pixel image for mosaicizing the determined target image, (5) create the mosaic image by mosaicizing the selected target image using the selected pixel images, and (6) output the created mosaic image by controlling the display unit 140.

A series of processes in which the control unit 160 creates and outputs the mosaic image may be able to be performed by reading a program and/or instructions for providing a service for creating the mosaic image stored in the storage unit 160.

In yet another exemplary embodiment, the control unit 160 of the terminal 100 may perform at least some of steps (1) to (6) and the mosaic server 200 may performs the remaining steps.

Meanwhile, FIG. 6 is a flowchart for describing a method for creating and providing a mosaic image based on an image tag-word according to another exemplary embodiment of the present disclosure.

Referring to FIG. 6, in another exemplary embodiment, the mosaic server 200 may create a mosaic image by first selecting pixel images and selecting a target image to be mosaicized using the pixel images selected afterwards.

Hereinafter, for effective description, a duplicated description with the described contents above may be omitted.

First, the mosaic server 200 may determine and classify a tag-word for the image of the user (S201).

Specifically, the mosaic server 200 may determine the tag-word matched with each image of the user based on the deep learning through the image classification unit 210 of the mosaic server 200 and classify the image based on the determined tag-word.

For example, the mosaic server 200 may receive a feedback of the user during the process of determining the tag-word of the image.

Specifically, the mosaic server 200 may receive the user feedback based on whether the tag-word is matched and/or an input of the user for an additional tag-word, and may determine the tag-word of the image by considering cognitive determination of the user in addition to artificial intelligence determination through the received user feedback.

Next, the mosaic server 200 that determines and classifies the image tag-word may classify the image for each category based on the determined tag-word (S203).

Specifically, the mosaic server 200 may create a category including a plurality of tag-words through the image classification unit 210, and may classify and manage the images including the tag-word included in the corresponding category into the corresponding category.

Next, the mosaic server 200 that classifies the image may select a pixel image (S205).

Specifically, the mosaic server 200 may first provide to the user the pixel image selection function based on the tag-word and/or category matched with the image through the pixel image filtering unit 230 of the mosaic server 200.

More specifically, the mosaic server 200 may provide to the user a pixel image selection interface capable of searching an image to be used for creating the mosaic image through the tag-word and/or category in link with the terminal 100 and selecting a predetermined number or more of images to be used as the pixel image among the images matched with the tag-word and/or category output through the search.

In addition, the mosaic server 200 may select pixel images to be used for the mosaic image based on the user input acquired through the pixel image selection interface.

As such, the mosaic server 200 may allow the user to constitute the mosaic image by classifying, extracting, and combining the image based on the tag-word and/or category of the image to allow the user to conveniently select the pixel images that are to constitute the mosaic image according to the demand of the user.

Next, the mosaic server 200 that selects the pixel image may select the target image (S207).

Specifically, the mosaic server 200 may receive the input of the user selecting the target image in link with the terminal 100 in order to select the target image.

In addition, the mosaic server 200 may select a target image to be expressed as the mosaic image based on the received input of the user.

Alternatively, the mosaic server 200 may automatically detect and provide the target image suitable to be mosaicized using the selected pixel images based on the deep learning through the target image recommendation unit 220.

Specifically, the mosaic server 200 may detect an image suitable to be created as the mosaic image based on the selected pixel images and provide the detected image as the recommended target image through the user terminal 100.

In this case, the mosaic server 200 may detect the recommended target image based on (1) the selected pixel images and/or (2) images (hereinafter, referred to as server images) stored in the mosaic server 200.

In the following description, the present disclosure will be described based on an exemplary embodiment in which the mosaic server 200 detects the recommended target image based on the selected pixel images.

More specifically, referring to FIG. 7, the mosaic server 200 may first determine the representative factor for each pixel image.

For example, the mosaic server 200 determines a representative factor representing a plurality of color and/or texture factors for each selected pixel image through the deep learning neural network to determine the representative factor for each pixel image.

Subsequently, the mosaic server 200 that determines the representative factor of each selected pixel image may create representative factor distribution data of the selected pixel images.

Here, the representative factor distribution data may be data providing which distribution form a plurality of representative factors represents based on the color and/or texture factor.

For example, the representative factor distribution data may be graph data representing a distribution form of a plurality of representative factors in a histogram format.

Thereafter, the mosaic server 200 that creates the representative factor distribution data of the pixel images may divide each pixel image into unit cells.

In other words, the mosaic server 200 may divide each pixel image into predetermined units (e.g., 100×100 blocks) and constitute the divided pixel images as a set of the unit cells.

Then, the mosaic server 200 may determine the representative factor of each unit cell of each pixel image through the deep learning neural network.

In addition, the mosaic server 200 may create the representative factor distribution data of the unit cells acquired for each pixel image.

Subsequently, the mosaic server 200 may compare the created representative factor distribution data of the pixel images with the representative factor distribution data of the unit cells acquired for each pixel image.

Thereafter, the mosaic server 200 may detect a pixel image, in which the matching rate of the representative factor distribution data of the pixel images and the representative factor distribution data of the unit cells acquired for each pixel image is higher than a predetermined criterion (e.g., a predetermined percentage) as a result of the comparison.

In addition, the mosaic server 200 may determine at least one detected pixel image as the recommended target image.

Further, the mosaic server 200 that determines the recommended target image may provide the determined recommended target image for each category to the user through the terminal 100.

In addition, the mosaic server 200 may provide the recommended target image to the user and then select the target image according to a target image selection input of the user acquired through the terminal 100.

Further, the mosaic server 200 may determine the recommended target image based on the server image by the same scheme as the description above, provide the recommended target image based on the determined server image to the user through the terminal 100, and then select the target image according to the target image selection input of the user acquired through the terminal 100.

As such, the mosaic server 200 may automatically detect and recommend the target image suitable to be created as the mosaic image based on the pixel images selected by the user to provide a target image capable of creating a high-fidelity mosaic image based on the selected pixel images and guide the user to select the provided target image.

Next, the mosaic server 200 that selects the pixel image and the target image may create the mosaic image by mosaicizing the selected target image using the selected pixel images (S209).

Specifically, the mosaic server 200 may create the mosaic image based on the target image and the plurality of pixel images using the deep neural network and/or the Earth Mover's Distance (EMD) through the mosaic image creation unit 240.

For example, the mosaic server 200 may match a corresponding pixel image having a representative factor of a pixel image having a highest matching degree (i.e., matching rate) with the representative factor of each unit cell of the target image with the corresponding unit cell and insert the pixel image. Therefore, the matching processing according to the exemplary embodiment of the present disclosure may maximize an overall color and/or texture similarity between each unit cell of the target image and the pixel image.

As such, the mosaic server 200 may create the mosaic image by matching the pixel image suitable for each unit cell of the target image to create a high-quality mosaic image expressing the target image with a high similarity using the pixel images.

Next, the mosaic server 200 that creates the mosaic image may transmit the created mosaic image to the terminal 100, and the terminal 100 may output the transmitted mosaic image (S211).

Specifically, the mosaic server 200 may transmit the created mosaic image to the terminal 100, and the terminal 100 that receives the mosaic image from the mosaic server 200 may output the received mosaic image as the graphic image through the display unit 140 (or 135) and provide the output mosaic image to the user.

In another exemplary embodiment, the control unit 160 of the terminal 100 may create the mosaic image by performing at least a part of data processing performed by the mosaic server 200. Specifically, the control unit 160 of the terminal 100 may (1) determine and classify the tag-word for the images of the user stored in the storage unit 150, (2) classify the image for each category based on the determined tag-word, (3) determine the pixel image, (4) determine the pixel image to be created based on the selected pixel image, (5) create the mosaic image by mosaicizing the selected target image using the selected pixel images, and 6) output the created mosaic image by controlling the display unit 140.

A series of processes in which the control unit 160 creates and outputs the mosaic image may be able to be performed by reading a program and/or instructions for providing a service for creating the mosaic image stored in the storage unit 160.

In yet another exemplary embodiment, the control unit 160 of the terminal 100 may perform at least some of steps (1) to (6) and the mosaic server 200 may perform the remaining steps.

Hereinabove, some exemplary embodiments of the present disclosure may provide a system and method for creating and providing a mosaic image based on an image tag-word, which matches a tag-word and/or a category with an image and allows a user to configure a mosaic image by classifying, extracting, and combining an image based on the tag-word and/or the category matched with the image to conveniently select pixel images to constitute the mosaic image according to the demand of the user.

Further, according to an exemplary embodiment of the present disclosure, a system and method for creating and providing a mosaic image based on an image tag-word may automatically detect and recommend a target image suitable to be created as a mosaic image based on the pixel images selected by the user to provide a target image capable of creating a high-fidelity mosaic image based on the selected pixel images and guide the user to select the provided target image.

In addition, according to an exemplary embodiment of the present disclosure, a system and method for creating and providing a mosaic image based on an image tag-word may automatically select and provide pixel images suitable for configuring a mosaic image to be created based on the target image selected by the user to easily provide the pixel images capable of creating the selected target image as the high-fidelity mosaic image and assist creation of the mosaic image using the pixel images associated with the selected target image.

Additionally, according to an exemplary embodiment of the present disclosure, an apparatus and method for creating and providing a mosaic image based on an image tag-word may classify, recommend, and filter an image using a deep-learning neural network to rapidly and efficiently perform the data processing required for a service for creating and providing the mosaic image based on the image tag-word using artificial intelligence.

Further, according to an exemplary embodiment of the present disclosure, a system and method for creating and providing a mosaic image based on an image tag-word may accept the feedback from the user at the time of determining the tag-word of the image to accurately determine the image tag-word by considering cognitive determination in addition to artificial intelligence determination.

In addition, according to an exemplary embodiment of the present disclosure, an apparatus and method for creating and providing a mosaic image based on an image tag-word may create a category which includes a plurality of tag-words and classify images to more systematically manage the images and allow an image search/selection process to be more efficiently operated.

Further, according to an exemplary embodiment of the present disclosure, an apparatus and method for creating and providing a mosaic image based on an image tag-word may automatically detect and recommend a target image suitable for creating the mosaic image for each category to provide the target image capable of creating the high-fidelity mosaic image based on the images included for each category and guide the user to select the provided target image.

Further, according to an exemplary embodiment of the present disclosure, an apparatus and method for creating and providing a mosaic image based on an image tag-word may create the mosaic image by matching the pixel image suitable for each unit cell of the target image using the deep learning neural network and/or Earth Mover's Distance (EMD) to create a high-quality mosaic image expressing the target image with a high similarity using the pixel images.

The operations according to the exemplary embodiments described above are implemented in a form of a program command which may be executed through various computer components means and may be recorded in the computer readable recording medium. The computer readable recording medium may include singly a program command, a data file, or a data structure or a combination thereof. The program command recorded in the computer readable recording medium may be specially designed and configured for the present invention, or may be publicly known to and used by those skilled in the computer software field.

Examples of the computer readable recording media may include a hardware device particularly configured to store and execute program commands, magnetic media such as hard disks, floppy disks, and magnetic tape, optical recording media such as CD-ROM disks and DVD, magneto-optical media such as floptical disks, ROM, RAM, and flash memories. Examples of the program commands include a high-level language code executable by a computer by using an interpreter, and the like, as well as a machine language code created by a compiler. The hardware devices may be changed to one or more software modules in order to perform the processing according to the present invention, and an opposite situation thereof is available.

Specific executions described in the present disclosure are exemplary embodiments and the scope of the present invention is not limited even by any method. For brevity of the specification, descriptions of conventional electronic configurations, control systems, software, and other functional aspects of the systems may be omitted. Further, connection or connection members of lines among components exemplarily represent functions connections and/or physical or circuitry connections and may be represented as various functional connections, physical connections, or circuitry connections which are replaceable or added in an actual device. Further, unless otherwise specified, such as "essential", "important", etc., the connections may not be components particularly required for application of the present invention.

Further, in the detailed description of the present disclosure, which is described, while the present disclosure has been described with respect to the preferred embodiments, it will be understood by those skilled in the art or those skilled in the art having ordinary knowledge in the technical field that various changes and modifications of the present invention may be made without departing from the spirit and the technical scope of the invention disclosed in the following claims. Therefore, the technical scope of the present invention should not be limited to the contents described in the detailed description of the specification but should be defined by the claims.

According to an exemplary embodiment of the present disclosure, an apparatus and method for creating and providing a mosaic image based on an image tag-word may match a tag-word and/or a category with an image and allow a user to configure a mosaic image by classifying, extracting, and combining an image based on the tag-word and/or the category matched with the image to easily determine pixel images to constitute the mosaic image.

Further, according to an exemplary embodiment of the present disclosure, an apparatus and method for creating and providing a mosaic image based on an image tag-word may automatically detect and recommend a target image suitable to be created as a mosaic image based on the pixel images selected by an user to provide a target image capable of creating a high-fidelity mosaic image based on the selected pixel images.

Additionally, according to an exemplary embodiment of the present disclosure, an apparatus and method for creating and providing a mosaic image based on an image tag-word may automatically select and provide pixel images suitable for configuring a mosaic image to be created based on a target image selected by an user to easily provide the pixel images capable of creating the selected target image as the high-fidelity mosaic image and create a high-quality mosaic image using the pixel images associated with the selected target image.

Further, according to an exemplary embodiment of the present disclosure, an apparatus and method for creating and providing a mosaic image based on an image tag-word may classify, recommend, and filter an image using a deep-learning neural network to rapidly and efficiently perform data processing required for a service for creating and providing the mosaic image based on the image tag-word using artificial intelligence.

In addition, according to an exemplary embodiment of the present disclosure, an apparatus and method for creating and providing a mosaic image based on an image tag-word may create a category which may include a plurality of tag-words and classify the image to more systematically and efficiently manage the image.

Further, according to an exemplary embodiment of the present disclosure, an apparatus and method for creating and providing a mosaic image based on an image tag-word may automatically detect and recommend a target image suitable for creating the mosaic image for each category to provide the target image capable of creating the high-fidelity mosaic image based on the images included for each category.

However, the effect which may be obtained in the present disclosure is not limited to the above-mentioned effects, and other effects not mentioned may be clearly understood from the following description.

What is claimed is:

1. A method for creating a mosaic image based on an image tag-word by a server for providing a mosaic service, the method comprising:
   determining each tag-word of each image, creating one or more categories, each category corresponding to at least one tag-word, and classifying each of a plurality of images into one of the categories according to the at least one tag-word corresponding to each category and the determined each tag-word of each image;
   determining a target image among the plurality of images;
   selecting a pixel image for mosaicizing the determined target image based on tag-words of the plurality of images; and
   creating a mosaic image for the target image based on the selected pixel image,
   wherein the determining of the target image among the plurality of images comprises:
   comparing representative factor distribution data of one or more images classified for each category with representative factor distribution data of unit cells of each of the one or more images classified for each category,
   selecting in each category an image according to a matching rate of the representative factor distribution data of the one or more images classified for each category and the representative factor distribution data of the unit cells of each of the one or more images classified for each category, and
   providing the selected image as a recommended target image.

2. The method of claim 1, wherein the determining of each tag-word of each image and the classifying of the plurality of images according to the determined each tag-word of each image includes inputting the plurality of images into a deep learning neural network to automatically determine each tag-word of each image.

3. The method of claim 1,
the recommended target image for each category among the one or more images classified for each category is selected using a deep learning neural network, and
the determining of the target image among the plurality of images further comprises acquiring an input of a user of selecting the target image from the recommended target image by providing a user interface.

4. The method of claim 1, wherein the selecting in each category the image according to the matching rate comprises;
selecting in each category an image, in which the matching rate of the representative factor distribution data of the one or more images classified for each category and the representative factor distribution data of the unit cells of each of the one or more images classified for each category is equal to or higher than a predetermined criterion.

5. The method of claim 1, wherein the selecting the pixel image includes:
providing an interface configured to receive selection of a tag-word or category from a user, and
selecting one or more images which correspond to the selection of the tag-word or category as the pixel image.

6. The method of claim 5, wherein the selecting the pixel image further includes providing a recommended tag-word using a deep learning neural network through the interface.

7. The method of claim 1, wherein the creating of the mosaic image includes dividing the target image into the unit cells, matching the pixel image for each unit cell, and inserting the pixel image matched with the each unit cell.

8. A method for creating a mosaic image based on an image tag-word by a server for providing a mosaic service, the method comprising:
determining each tag-word of each image and classifying a plurality of images according to the determined each tag-word of each image;
determining a pixel image among the plurality of images;
selecting a target image for mosaicizing the determined pixel image based on tag-words of the plurality of images; and
creating a mosaic image based on the determined pixel image and the target image,
wherein the selecting of the target image comprises:
comparing representative factor distribution data of the determined pixel image with representative factor distribution data of unit cells of the determined pixel image, and
providing the pixel image as a recommended pixel image according to a matching rate of the representative factor distribution data of the determined pixel image and the representative factor distribution data of the unit cells of the determined pixel image is equal to or higher than a predetermined criterion.

9. The method of claim 8, wherein:
the recommended target image among the determined pixel image and/or the plurality of images is selected using a deep learning neural network, and
the selecting of the target image comprises acquiring an input of a user of selecting the target image based on the recommended target image and/or the plurality of images.

10. The method of claim 8, wherein:
the providing of the pixel image as the recommended pixel image according to the matching rate comprises providing the pixel image, in which a matching rate of the representative factor distribution data of the determined pixel image and the representative factor distribution data of the unit cells of the determined pixel image is equal to or higher than a predetermined criterion, as the recommended pixel image.

11. An apparatus for providing a mosaic image, the apparatus comprising:
a storage configured to store a plurality of images and a program for creating a mosaic image based on the plurality of images;
a display configured to output the created mosaic image; and
a processor configured to read the program stored in the storage and create the mosaic image,
wherein the processor is configured to:
determine each tag-word of each image, create one or more categories, each category corresponding to at least one tag-word, and classify each of the plurality of images into one of the categories according to the at least one tag-word corresponding to each category and the determined each tag-word of each image,
determine a target image among the plurality of images by comparing representative factor distribution data of one or more images classified for each category with representative factor distribution data of unit cells of each of the one or more images classified for each category, selecting in each category an image according to a matching rate of the representative factor distribution data of the one or more images classified for each category and the representative factor distribution data of the unit cells of each of the one or more images classified for each category, and providing the selected image as a recommended target image,
selecting a pixel image for mosaicizing the determined target image based on tag-words of the plurality of images,
create a mosaic image for the target image based on the pixel image selected through the interface for selecting the pixel image.

12. The apparatus of claim 11, wherein the processor is configured to:
use a deep learning neural network to select in each category the image and provide the recommended target image, and
acquire an input of a user of selecting the target image from the recommended target image and determine the target image among the plurality of images by providing a user interface.

13. The apparatus of claim 11, wherein the processor is configured to:
detect in each category an image, in which the matching rate of the representative factor distribution data of the one or more images classified for each category and the representative factor distribution data of the unit cells of each of the one or more images classified for each category is equal or higher than a predetermined criterion.

14. The apparatus of claim 11, wherein the processor is configured to:
provide an interface configured to receive selection of a tag-word or category from a user, select one or more images which correspond to the selection of the tag-word or category as the pixel image, and provide a recommended tag-word using a deep learning neural network.

15. The apparatus of claim 11, wherein the processor is configured to divide the target image into the unit cells, match the pixel image for each unit cell, and insert the pixel image matched with the each unit cell to create the mosaic image.

* * * * *